United States Patent
Tonouchi et al.

(10) Patent No.: US 11,966,653 B2
(45) Date of Patent: Apr. 23, 2024

(54) INFORMATION PROCESSING SYSTEM, INFORMATION PROCESSING APPARATUS, AND INFORMATION PROCESSING METHOD FOR MANAGING PRINT DATA

(71) Applicant: FUJIFILM Business Innovation Corp., Tokyo (JP)

(72) Inventors: Masaharu Tonouchi, Kanagawa (JP); Takashi Kojima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/704,004

(22) Filed: Mar. 25, 2022

(65) Prior Publication Data

US 2023/0084018 A1 Mar. 16, 2023

(30) Foreign Application Priority Data

Sep. 10, 2021 (JP) .................................. 2021-148047

(51) Int. Cl.
*G06F 3/12* (2006.01)
(52) U.S. Cl.
CPC ............ *G06F 3/1275* (2013.01); *G06F 3/121* (2013.01); *G06F 3/126* (2013.01); *G06F 3/1268* (2013.01); *G06F 3/1285* (2013.01)
(58) Field of Classification Search
None
See application file for complete search history.

(56) References Cited

U.S. PATENT DOCUMENTS

| | | | | |
|---|---|---|---|---|
| 2011/0261407 A1* | 10/2011 | Kikuchi | ................ | G06F 3/1288 358/1.15 |
| 2013/0077128 A1* | 3/2013 | Ichida | ................... | G06F 3/1244 358/1.15 |

FOREIGN PATENT DOCUMENTS

JP 2012-111170 6/2012

* cited by examiner

*Primary Examiner* — Lennin R Rodriguezgonzalez
(74) *Attorney, Agent, or Firm* — JCIPRNET

(57) ABSTRACT

An information processing system includes: a processing apparatus that includes a first processor and performs processing of print data; and a management apparatus that includes a second processor, generates print data, transmits the print data to the processing apparatus, and manages the print data, the first processor being configured to: make a request to the management apparatus for registration of first print data with the management apparatus, the first print data serving as a target for processing by the processing apparatus, the second processor being configured to: receive the request for the registration from the processing apparatus, and in response to the first print data not being the print data generated by the management apparatus, newly register the first print data with the management apparatus and manage the first print data.

13 Claims, 5 Drawing Sheets

```
<JDF ID="0001" DescriptiveName="JobNameaaa" Activation="Active" Status="Waiting" Version="1.3" >
 <ResourcePool>
  <LayoutElement Class="Parameter" ID="LayoutElement_1" Status="Available">
   <FileSpec URL="http://192.168.0.1/p1.pdf" Class="Parameter" />
  </LayoutElement>                                    54
  <Media ProductID="#Tray6" Class="Consumable" ID="media1" Status="Available" />
 </ResourcePool>                     56
 <ResourceLinkPool>
  <RunListLink rRef="RunList_1" Usage="Input" />
  <MediaLink rRef="media1" Usage="Input" />
  <ComponentLink Amount="100" Usage="Input" />
 </ResourceLinkPool>                   58
</JDF>
```

```
<JDF ID="0001" DescriptiveName="JobNameaaa" Activation="Active" Status="Waiting" Version="1.3"
 DummyJob="true" DFEJobID="1" DFEAddress="123.123.123.123">
</JDF>
           62           64           66
```

FIG. 7

| WF JOB ID | IP ADDRESS | DFE JOB ID | JOB STATUS | NUMBER OF SHEETS |
|---|---|---|---|---|
| 1 | 192.168.0.1 | 1 | PRINTING COMPLETE | 100 |
| 2 | 192.168.0.1 | 100 | WAITING | 0 |
| 3 | 192.168.0.2 | 1 | PRINTING COMPLETE | 5 |

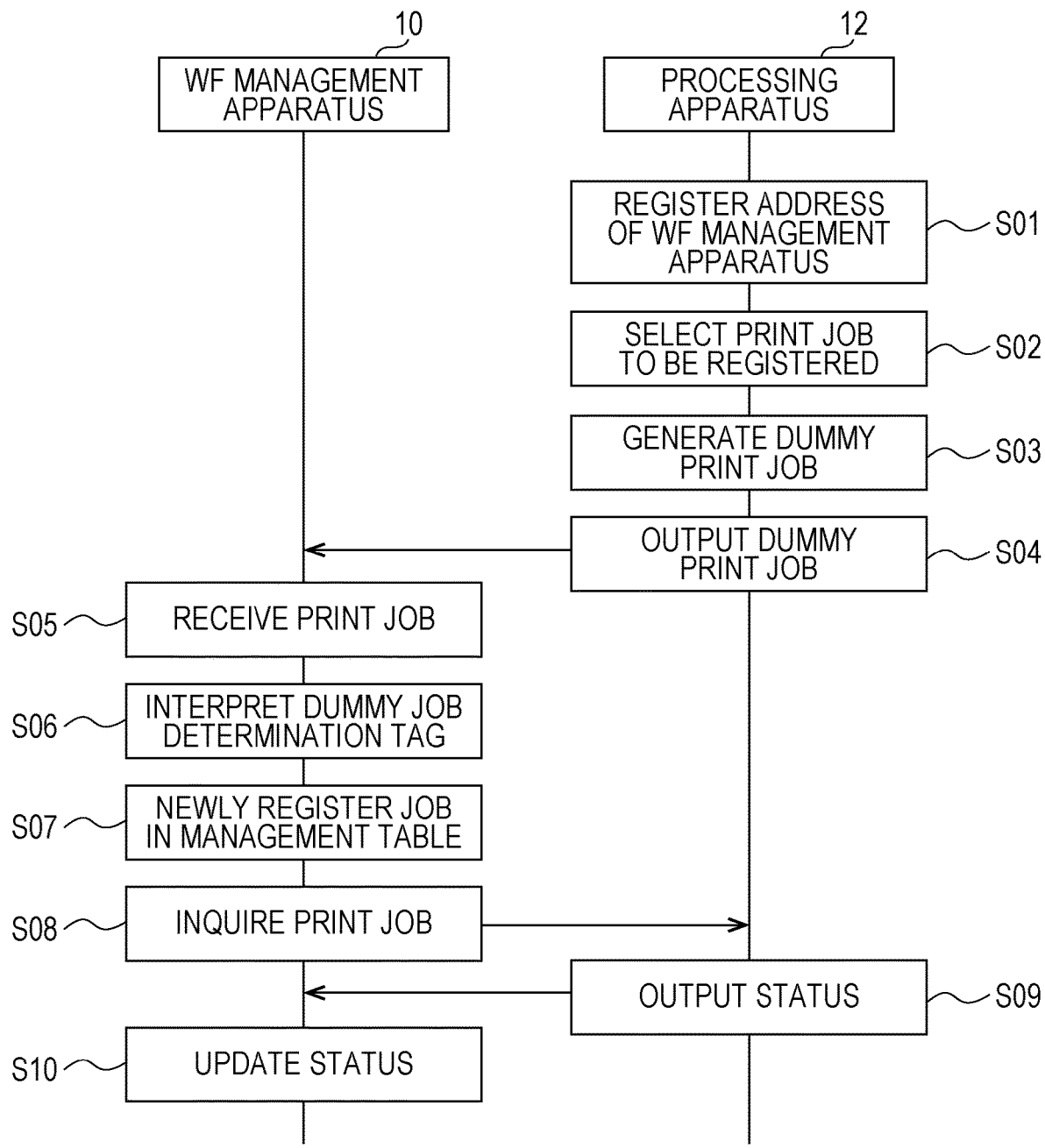

INFORMATION PROCESSING SYSTEM, INFORMATION PROCESSING APPARATUS, AND INFORMATION PROCESSING METHOD FOR MANAGING PRINT DATA

CROSS-REFERENCE TO RELATED APPLICATIONS

This application is based on and claims priority under 35 USC 119 from Japanese Patent Application No. 2021-148047 filed Sep. 10, 2021.

BACKGROUND

(i) Technical Field

The present disclosure relates to an information processing system, an information processing apparatus, and an information processing method.

(ii) Related Art

A system including a processing apparatus and a management apparatus is known. The processing apparatus processes print data for printing to be performed by a printer. The management apparatus generates print data, transmits the print data to the processing apparatus, and manages the print data. The processing apparatus receives the print data transmitted from the management apparatus and processes the print data.

Japanese Unexamined Patent Application Publication No. 2012-111170 describes a device by which a print job generated in reprinting using a history printing function of the device after the completion of a print job is notified to a management information system (MIS) in association with the completed print job.

SUMMARY

For example, there are cases where an apparatus other than the management apparatus transmits print data to the processing apparatus, where the processing apparatus generates print data, and where the processing apparatus duplicates print data. The print data in each case is not print data generated and transmitted to the processing apparatus by the management apparatus. If nothing is done, it is not possible for the management apparatus to manage the print data.

Aspects of non-limiting embodiments of the present disclosure relate to a system that enables a management apparatus to manage even print data other than print data generated by the management apparatus and transmitted to a processing apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including: a processing apparatus that includes a first processor and performs processing of print data; and a management apparatus that includes a second processor, generates print data, transmits the print data to the processing apparatus, and manages the print data, the first processor being configured to: make a request to the management apparatus for registration of first print data with the management apparatus, the first print data serving as a target for processing by the processing apparatus, the second processor being configured to: receive the request for the registration from the processing apparatus, and in response to the first print data not being the print data generated by the management apparatus, newly register the first print data with the management apparatus and manage the first print data.

BRIEF DESCRIPTION OF THE DRAWINGS

An exemplary embodiment of the present disclosure will be described in detail based on the following figures, wherein:

FIG. 5 is a view illustrating a job ticket of a print job that is not a dummy print job;

FIG. 6 is a view illustrating a job ticket of a dummy print job;

FIG. 7 is a table illustrating a management table for managing print jobs; and

FIG. 8 is a flowchart illustrating the flow of processes by the information processing system.

DETAILED DESCRIPTION

Figure 1:
FIG. 1 is a block diagram illustrating the configuration of an information processing system.

An information processing system according to an exemplary embodiment will be described with reference to FIG. 1. FIG. 1 illustrates an example configuration of the information processing system according to the exemplary embodiment.

The information processing system according to the exemplary embodiment includes, for example, a workflow (WF) management apparatus 10, a processing apparatus 12, and a printer 14.

The WF management apparatus 10, the processing apparatus 12, and the printer 14 each have a function of communicating with a different apparatus. The communication may be wired communication using a cable or wireless communication. For example, the WF management apparatus 10 and the processing apparatus 12 are connected to a communication path to a local area network (LAN), the Internet, or the like and communicate with each other via the communication path.

The WF management apparatus 10 manages processes in a printing workflow. The printing workflow includes processes such as document generation, document transfer, document reading, correction, composition (for example, paging), calibration, imposition (for example, data formation), color calibration, and printing. For example, the WF management apparatus 10 manages printing cost (for example, the type and the number of used printing sheets) and the progress of the printing. The WF management apparatus 10 corresponds to an example of a management apparatus.

For example, the WF management apparatus 10 receives a job ticket of a print job from an external apparatus other than the processing apparatus 12, outputs the received job ticket of the print job to the processing apparatus 12, and manages a workflow regarding the print job. The WF management apparatus 10 may also have a function of generating a job ticket of a print job, output the generated job ticket of the print job to the processing apparatus 12, and manage a workflow regarding the print job. The WF management apparatus 10 may also generate a job ticket of a print job by duplicating a job ticket of a print job, output the job ticket generated by duplicating the print job to the processing apparatus 12, and manage a workflow regarding the print job.

A job ticket of a print job corresponds to an example of print data. The job ticket is information including, for example, information for identifying document data regarding a printing target (such as image data or document data), information indicating an area where the document data is stored (for example, an address), and information indicating printing conditions (such as the number of copies, the type of a printing sheet, and the size of the printing sheet). The job ticket of the print job itself may include document data. The document data specified in the job ticket is data described in a page description language (PDL).

The processing apparatus 12 receives the job ticket of the print job and processes the print job. The processing apparatus 12 is, for example, a digital front end (DFE). In detailed description, the processing apparatus 12 includes a raster image processor (RIP) serving as a rasterizer and converts the document data specified in the job ticket into raster data (for example, bitmap data) in a format suitable for printing to be performed by the printer 14.

For example, the WF management apparatus 10 outputs a job ticket of a print job to the processing apparatus 12, and the processing apparatus 12 receives the job ticket of the print job output from the WF management apparatus 10 and processes the print job. A different apparatus (for example, a personal computer) other than the WF management apparatus 10 may also output a job ticket of a print job to the processing apparatus 12, and the processing apparatus 12 may receive the job ticket of the print job output from the different apparatus and process the print job.

The processing apparatus 12 may generate a job ticket of a print job and process the generated print job. The processing apparatus 12 may also generate a job ticket of a print job by duplicating a job ticket of a print job and process the print job generated by the duplication.

The processing apparatus 12 may change a printing condition or the like included in the job ticket of the print job.

Intermediate data may be generated from document data, and the processing apparatus 12 may convert the intermediate data into raster data. The intermediate data may be generated by the WF management apparatus 10 or a different apparatus. The processing apparatus 12 outputs the raster data to the printer 14.

The printer 14 receives the raster data for printing from the processing apparatus 12 and prints the raster data on the recording medium such as a printing sheet. A system for the printing may be any system. For example, an inkjet system, an electrophotographic system, a thermal system, or a thermal transfer system is used. The printer 14 may be included in the processing apparatus 12.

The example in FIG. 1 illustrates the one processing apparatus 12 and the one printer 14; however, the information processing system according to the exemplary embodiment may include multiple processing apparatuses 12 and multiple printers 14. The WF management apparatus 10 may output, to the multiple processing apparatuses 12, identical job tickets based on one print job or different job tickets based on respective print jobs and may manage the print jobs processed by the respective processing apparatuses 12. The processing apparatus 12 may also output identical or different raster data to the multiple printers 14.

Figure 2:
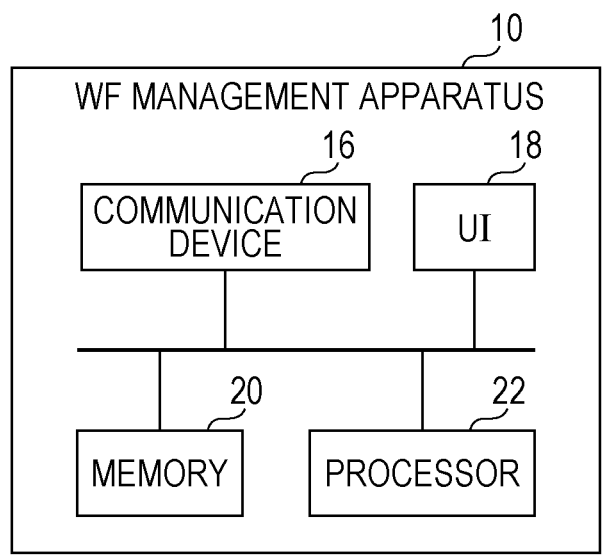
FIG. 2 is a block diagram illustrating the hardware configuration of a workflow (WF) management apparatus.

Hereinafter, the hardware configuration of the WF management apparatus 10 will be described with reference to FIG. 2. FIG. 2 illustrates an example of the hardware configuration of the WF management apparatus 10.

The WF management apparatus 10 includes, for example, a communication device 16, a user interface (UI) 18, a memory 20, and a processor 22.

The communication device 16 is a communication interface having a communication chip, a communication circuit, and other components and has a function of transmitting information to a different apparatus by using wireless communication or wired communication and a function of receiving information transmitted from the different apparatus.

The UI 18 includes a display and an operation device. The display is a liquid crystal display, an electroluminescence (EL) display, or another display. The operation device is a keyboard, a mouse, an input key, an operation panel, or another device. The UI 18 may be a UI such as a touch panel doubly serving as the display and the operation device. The UI 18 may also include a microphone and a speaker.

The memory 20 is composed of one or more memory areas where data is stored. The memory 20 is, for example, a hard disk drive (HDD), a solid state drive (SSD), any one of various memories (such as a random-access memory (RAM), a dynamic RAM (DRAM), and a read-only memory (ROM)), another memory device (such as an optical disk), or combination of these. The WF management apparatus 10 includes one or more memories 20.

The processor 22 controls the operation of the components of the WF management apparatus 10. The processor 22 may include a memory. The processor 22 corresponds to an example of a second processor.

Figure 3:
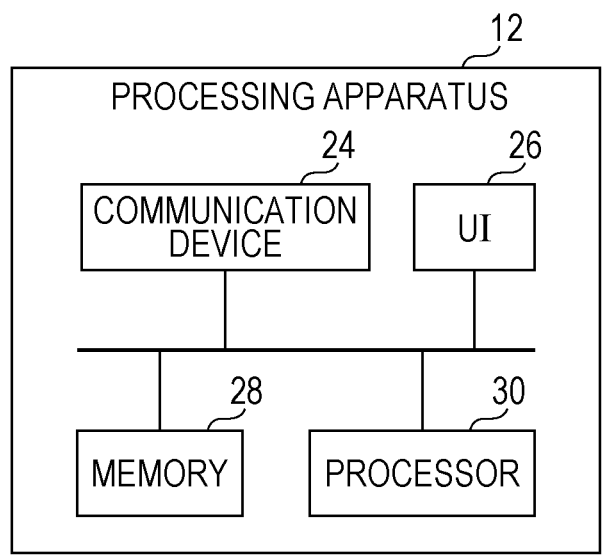
FIG. 3 is a block diagram illustrating the hardware configuration of a processing apparatus.

Hereinafter, the hardware configuration of the processing apparatus 12 will be described with reference to FIG. 3. FIG. 3 illustrates an example of the hardware configuration of the processing apparatus 12.

The processing apparatus 12 includes, for example, a communication device 24, a UI 26, a memory 28, and a processor 30.

The communication device 24 is a communication interface having a communication chip, a communication circuit, and other components and has a function of transmitting information to a different apparatus by using wireless communication or wired communication and a function of receiving information transmitted from a different apparatus.

The UI 26 includes a display and an operation device. The display is a liquid crystal display, an EL display, or another display. The operation device is a keyboard, a mouse, an input key, an operation panel, or another device. The UI 26 may be a UI such as the touch panel doubly serving as the display and the operation device. The UI 26 may also include a microphone and a speaker.

The memory 28 is composed of one or more memory areas where data is stored. The memory 28 is, for example, a HDD, a SSD, any one of various memories (such as a RAM, a DRAM, and a ROM), another memory device (such as an optical disk), or combination of these. The processing apparatus 12 includes one or more memories 28.

The processor 30 controls the operation of the components of the processing apparatus 12. The processor 30 may include a memory. The processor 30 corresponds to an example of a first processor.

Figure 4:
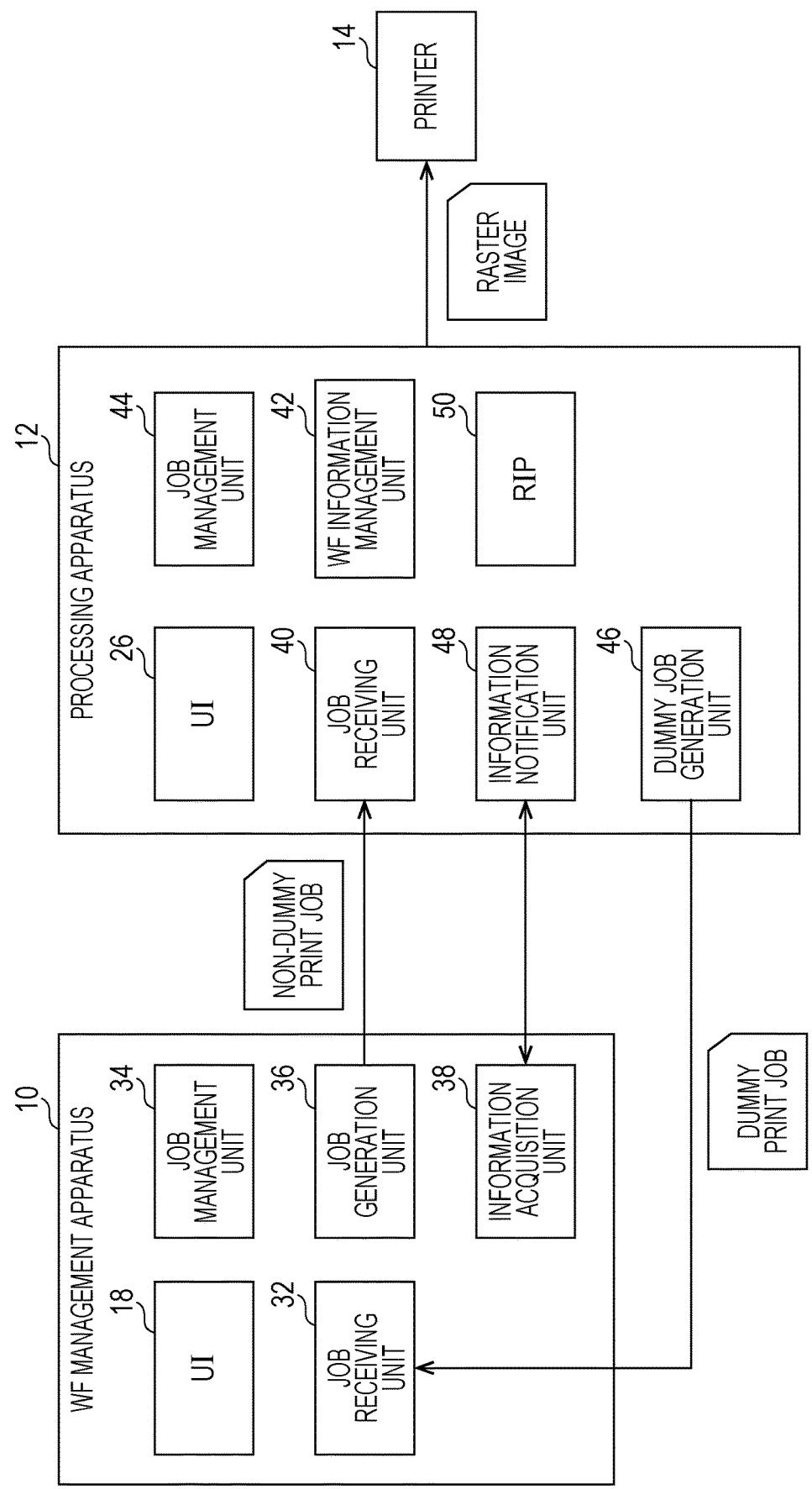
FIG. 4 is a block diagram illustrating the functions of each of the WF management apparatus and the processing apparatus.

Hereinafter, the functions of each of the WF management apparatus 10 and the processing apparatus 12 will be described with reference to FIG. 4. FIG. 4 is a block diagram illustrating the functions of each of the WF management apparatus 10 and the processing apparatus 12.

The WF management apparatus 10 includes the UI 18, a job receiving unit 32, a job management unit 34, a job generation unit 36, and an information acquisition unit 38.

The UI 18 includes the display and the operation device as described above. For example, a list of print jobs managed by the job management unit 34 (for example, information indicating the identification or the status of a print job) is displayed on the display included in the UI 18. For example, in response to a user giving an instruction to display the print job list by using the UI 18, the list of the print jobs managed by the job management unit 34 is displayed on the display included in the UI 18.

The job receiving unit 32 receives a job ticket of a print job transmitted from the external apparatus to the WF management apparatus 10. In addition, if the processing apparatus 12 transmits a job ticket of a dummy print job to the WF management apparatus 10 (described later), the job receiving unit 32 receives the job ticket of the dummy print job. The dummy print job is a print job in which document data serving as a printing target is not specified. The dummy print job will be described in detail later.

To receive a job ticket, for example, a hot folder (HF) is used. It goes without saying that the job receiving unit 32 may receive the job ticket by a method other than this receiving method.

Hereinafter, a print job that is not a dummy print job is referred to as a non-dummy print job. A print job conceptually includes a non-dummy print job and a dummy print job.

The job receiving unit 32 registers the received print job (for example, a non-dummy print job or a dummy print job) with the job management unit 34.

The job management unit 34 manages print jobs. For example, the job management unit 34 manages each print job in such a manner as to relate the following identifications to each other: an identification for causing the print job to be identified in the WF management apparatus 10 (for example, a WF job ID); an identification for causing the print job to be identified in the processing apparatus 12 (for example, a DFE job ID); and an identification for identifying the processing apparatus 12 that processes the print job (for example, an IP address of the processing apparatus 12). The job management unit 34 may also manage information indicating the status of the print job in such a manner as to relate the status information to the identifications of the print job. For example, these pieces of information are stored in the memory 20 of the WF management apparatus 10.

In an example, the job management unit 34 herein manages each print job in such a manner as to relate the WF job ID, the DFE job ID, and the IP address of the processing apparatus 12 to each other.

The identification for causing the print job to be identified in the WF management apparatus 10 corresponds to an example of a second print data identification. The identification for causing the print job to be identified in the processing apparatus 12 corresponds to an example of a first print data identification. The IP address of the processing apparatus 12 corresponds to an example of a processing apparatus identification.

The WF job ID is generated by the job management unit 34. For example, in response to the job receiving unit 32 receiving a job ticket of a print job (for example, a non-dummy print job or a dummy print job), the job management unit 34 generates a WF job ID for identifying the print job and manages the print job by using the WF job ID. In addition, in response to the WF management apparatus 10 generating a non-dummy print job, the job management unit 34 generates a WF job ID for identifying the non-dummy print job and manages the non-dummy print job by using the WF job ID. It goes without saying that the WF job ID may be generated at different timing.

The DFE job ID is generated by the processing apparatus 12. If the information processing system include the multiple processing apparatuses 12, the processing apparatuses 12 separately generate DFE job IDs. For example, if the WF management apparatus 10 outputs a job ticket of a non-dummy print job to one of the processing apparatuses 12, the processing apparatus 12 generates a DFE job ID of the non-dummy print job and outputs the DFE job ID to the WF management apparatus 10 as a response to the output of the job ticket. The job management unit 34 receives the DFE job ID output from the processing apparatus 12 and relates the DFE job ID to the WF job ID of the non-dummy print job. The processing apparatus 12 manages the non-dummy print job by using the DFE job ID (described later).

The IP address of the processing apparatus 12 is stored in advance, for example, in the memory 20 of the WF management apparatus 10. If the multiple processing apparatuses 12 are connected to the WF management apparatus 10, each IP address of the corresponding processing apparatus 12 is stored in advance in the memory 20. Information other than the IP address (such as a MAC address, a manufacturing number, or a name) may be used as the identification of the processing apparatus 12.

The job generation unit 36 generates a job ticket of a non-dummy print job. The generated job ticket of the non-dummy print job is output to the processing apparatus 12, and the non-dummy print job is managed by the job management unit 34. The non-dummy print job generated by the WF management apparatus 10 corresponds to an example of second print data. A non-dummy print job received by the job receiving unit 32 from a different apparatus other than the processing apparatus 12 may be conceptually included in the second print data.

The information acquisition unit 38 inquires of the processing apparatus 12 about information regarding a non-dummy print job, acquires the information regarding the non-dummy print job from the processing apparatus 12 as a response to the inquiry, and registers the information regarding the non-dummy print job with the job management unit 34. If the multiple processing apparatuses 12 are connected to the WF management apparatus 10, the information acquisition unit 38 inquires of each processing apparatus 12 about information regarding the non-dummy print job processed by the processing apparatus 12 and acquires the information regarding the non-dummy print job from the processing apparatus 12. The information acquisition unit 38 inquires of the processing apparatus 12 about the information regarding the non-dummy print job in such a manner as to include, in information indicating the inquiry, the DFE job ID of the non-dummy print job regarding which the inquiry is made. The information regarding the non-dummy print job includes, for example, information indicating the status of the non-dummy print job.

If the multiple processing apparatuses 12 are included in the information processing system, each processing apparatus 12 generates a DFE job ID for identifying a non-dummy print job, and thus some processing apparatuses 12 generate identical DFE job IDs on occasions. Even in this case, one of the processing apparatuses 12 that processes the non-dummy print job is identified because the WF management apparatus 10 manages the non-dummy print job in such a manner as to relate, to the DFE job ID, the identification of the processing apparatus 12 that processes the non-dummy print job (for example, the IP address of the processing apparatus 12).

The processing apparatus 12 includes the UI 26, a job receiving unit 40, a WF information management unit 42, a job management unit 44, a dummy job generation unit 46, an information notification unit 48, and a RIP 50.

The UI 26 includes the display and the operation device as described above. For example, the list of print jobs managed by the job management unit 44 (for example, an identification and information indicating the status of a print job) is displayed on the display of the UI 26. For example, in response to the user giving an instruction to display the list of the print jobs by using the UI 26, the list of the print jobs managed by the job management unit 44 is displayed on the display included in the UI 26.

The job receiving unit 40 receives a job ticket of a non-dummy print job transmitted from the WF management apparatus 10 or a different apparatus to the processing apparatus 12. The job receiving unit 40 registers the received non-dummy print job with the job management unit 44.

The WF information management unit 42 manages information regarding the WF management apparatus 10. The information regarding the WF management apparatus 10 includes, for example, information indicating a path to the hot folder (HF) for the WF management apparatus 10. The information indicating the path is managed in such a manner as to be stored in advance in the memory 28 of the processing apparatus 12.

The job management unit 44 manages non-dummy print jobs. For example, the job management unit 44 manages each non-dummy print job in such a manner as to relate an identification for causing the non-dummy print job to be identified in the processing apparatus 12 (for example, a DFE job ID) to the information indicating the status of the non-dummy print job. For example, these pieces of information are stored in the memory 28 of the processing apparatus 12.

In response to receiving an instruction to duplicate a non-dummy print job, the job management unit 44 duplicates a job ticket of the non-dummy print job. In response to receiving an instruction to generate a non-dummy print job, the job management unit 44 generates a job ticket of the non-dummy print job. These instructions are given, for example, by the user by using the UI 26. For example, the list of the non-dummy print jobs managed by the job management unit 44 is displayed on the display of the UI 26. The user selects a non-dummy print job from the list and gives a duplication instruction, and the job management unit 44 then duplicates a job ticket of the non-dummy print job selected by the user.

The job management unit 44 generates a DFE job ID for causing a non-dummy print job to be identified in the processing apparatus 12.

For example, in response to the job receiving unit 40 receiving a job ticket of a non-dummy print job, the job management unit 44 generates a DFE job ID for identifying the non-dummy print job and manages the non-dummy print job by using the DFE job ID. If the job ticket of the non-dummy print job is output from the WF management apparatus 10 to the processing apparatus 12, the job management unit 44 outputs the DFE job ID of the non-dummy print job to the WF management apparatus 10 as a response to the output.

In addition, if the processing apparatus 12 generates or duplicates a job ticket of a non-dummy print job, the job management unit 44 generates a DFE job ID for identifying the non-dummy print job and manages the non-dummy print job by using the DFE job ID.

The job ticket of the non-dummy print job may include the WF job ID for causing the non-dummy print job to be identified in the WF management apparatus 10 and may be output from the WF management apparatus 10 to the processing apparatus 12. In this case, the job management unit 44 manages the non-dummy print job in such a manner as to relate the WF job ID, the DFE job ID, and the information indicating the status to each other.

The dummy job generation unit 46 generates a job ticket of a dummy print job. For example, if an instruction to generate a dummy print job for a non-dummy print job managed by the job management unit 44 is given, the dummy job generation unit 46 generates the job ticket of the dummy print job for the non-dummy print job. The job ticket of the dummy print job includes: dummy information indicating the print job is a dummy print job; an identification for identifying a non-dummy print job (for example, a DFE job ID) serving as the generation source of the dummy print job; and the identification of the processing apparatus 12 (for example, an IP address) for identifying the processing apparatus 12 itself. The dummy print job is a print job in which printing target document data is not specified. The job ticket of the dummy print job does not specify the printing target document data and a printing condition. The job ticket of the dummy print job corresponds to an example of management information.

The dummy job generation unit 46 also outputs the job ticket of the dummy print job to the WF management apparatus 10. For example, the dummy job generation unit 46 stores the job ticket of the dummy print job in the hot folder managed by the WF information management unit 42. The job receiving unit 32 of the WF management apparatus 10 acquires the job ticket of the dummy print job stored in the hot folder. It goes without saying that the job ticket of the dummy print job may be output from the processing apparatus 12 to the WF management apparatus 10 by a method other than this method.

For example, a list of non-dummy print jobs managed by the job management unit 44 is displayed on the display of the UI 26. The user selects a non-dummy print job from the list and gives an instruction to generate a dummy print job, and the dummy job generation unit 46 then generates a job ticket of the dummy print job for the non-dummy print job. The dummy job generation unit 46 may also generate a job ticket of a dummy print job for the non-dummy print job, in response to the user giving an instruction to register the non-dummy print job with the WF management apparatus 10.

In response to the inquiry from the information acquisition unit 38, the information notification unit 48 outputs the information regarding the non-dummy print job managed by the job management unit 44 to the WF management apparatus 10. The information indicating the inquiry includes the DFE job ID of the non-dummy print job. The information notification unit 48 outputs, to the WF management apparatus 10, the information indicating the status managed by the job management unit 44 in relation to the DFE job ID. The information indicating the status of the non-dummy print job regarding which the inquiry is made is thereby output to the WF management apparatus 10. Note that information such as information indicating the number of used sheets may be included in the information indicating the status.

The job receiving unit 32 of the WF management apparatus 10 receives the job ticket of the dummy print job output from the processing apparatus 12. The job ticket of the dummy print job is provided with a dummy job determination tag in which information indicating whether the print job is a dummy print job. The job receiving unit 32 determines whether the job ticket is a job ticket of a dummy print job on the basis of the information described in the dummy job determination tag in the received job ticket.

If the information indicating that the print job is a dummy print job is described in the dummy job determination tag in the job ticket of the print job received by the job receiving unit 32, the job receiving unit 32 determines that the print job is a dummy print job. In this case, even if the job ticket does not specify document data, the job receiving unit 32 registers the print job (that is, a dummy print job) with the job management unit 34. The job ticket of the dummy print job includes the DFE job ID and the identification (for example, the IP address) of the processing apparatus 12 that has generated the dummy print job. The job receiving unit 32 registers the DFE job ID and the IP address of the processing apparatus 12 with the job management unit 34. The job management unit 34 generates a WF job ID for causing the dummy print job to be identified in the WF management apparatus 10 and manages the dummy print job in such a manner as to relate the WF job ID, the DFE job ID of the dummy print job, and the IP address of the processing apparatus 12 to each other. The non-dummy print job serving as the generation source of the dummy print job is thereby managed by the WF management apparatus 10 by using the DFE job ID.

The RIP 50 converts document data specified in the job ticket of a non-dummy print job into raster data in a format suitable for printing to be performed by the printer 14. The raster data is output to the printer 14, and the printer 14 prints the rater data on the recording medium such as a printing sheet.

Hereinafter, a job ticket of a non-dummy print job will be described with reference to FIG. 5. FIG. 5 illustrates a job ticket 52 of a non-dummy print job.

The job ticket 52 illustrated in FIG. 5 is a job ticket of a non-dummy print job received by the WF management apparatus 10 from the external apparatus other than the processing apparatus 12 or a job ticket of a non-dummy print job generated by the WF management apparatus 10. The job ticket 52 describes information (for example, an address) indicating an area where printing target document data is stored as represented by Reference 54 and pieces of information indicating printing conditions as respectively represented by References 56 and 58. As described above, the job ticket 52 of the non-dummy print job specifies printing target document data and printing conditions.

After receiving the job ticket 52, the job receiving unit 32 of the WF management apparatus 10 determines whether the job ticket 52 has a dummy job determination tag. A job ticket of a dummy print job has a dummy job determination tag describing information indicating whether the print job is a dummy print job, while a job ticket of a non-dummy print job does not have the dummy job determination tag. In the example illustrated in FIG. 5, the job ticket 52 does not have the dummy job determination tag, and thus the job receiving unit 32 determines that the job ticket 52 is a job ticket of a non-dummy print job.

The job management unit 34 of the WF management apparatus 10 generates a WF job ID for causing a non-dummy print job implemented by the job ticket 52 to be identified in the WF management apparatus 10 and manages the non-dummy print job by using the WF job ID.

After the job ticket 52 of the non-dummy print job is output from the WF management apparatus 10 to the processing apparatus 12, the job management unit 44 of the processing apparatus 12 generates a DFE job ID for causing a non-dummy print job to be identified in the processing apparatus 12 and manages the non-dummy print job by using the DFE job ID.

In addition, the DFE job ID is output from the processing apparatus 12 to the WF management apparatus 10, as a response to the output of the job ticket 52 from the WF management apparatus 10 to the processing apparatus 12. The job management unit 34 of the WF management apparatus 10 manages the non-dummy print job implemented by the job ticket 52 in such a manner as to relate, to each other, the WF job ID of the job ticket 52, the DFE job ID output from the processing apparatus 12, and the identification of the processing apparatus 12 serving as the transmission destination of the job ticket 52 (for example, the IP address for identifying the processing apparatus 12).

The WF job ID may be output, together with the job ticket 52 from the WF management apparatus 10 to the processing apparatus 12. In this case, the job management unit 44 of the processing apparatus 12 manages the WF job ID and the DFE job ID in relation to each other.

The RIP 50 of the processing apparatus 12 acquires document data specified in the job ticket 52 on the basis of the address indicated by Reference 54 and converts the document data into raster data. The raster data is output to and printed by the printer 14.

The job management unit 44 of the processing apparatus 12 manages the status of the non-dummy print job implemented by the job ticket 52. In addition, in response to an inquiry from the WF management apparatus 10, information indicating the status is output from the processing apparatus 12 to the WF management apparatus 10.

Hereinafter, a job ticket of a dummy print job will be described with reference to FIG. 6. FIG. 6 illustrates a job ticket 60 of a dummy print job.

The job ticket 60 is a job ticket output from the processing apparatus 12 to the WF management apparatus 10. The job ticket 60 has a dummy job determination tag (that is, a section where information indicating whether the print job is a dummy print job) indicated by Reference 62, a DFE job ID tag (that is, a section where a DFE job ID is described) indicated by Reference 64, and an IP address tag (that is, a section where the IP address of the processing apparatus 12 is described) indicated by Reference 66.

The dummy job determination tag describes the information indicating whether the print job is a dummy print job. For example, if the character string "true" is described, the description denotes that the print job is a dummy print job. The character string "true" corresponds to an example of dummy information. If the character string "false" is described, or if the dummy job determination tag does not have a character string, the description denotes that the print job is not a dummy print job.

The DFE job ID described in the job ticket 60 is a DFE job ID for identifying the non-dummy print job serving as the generation source of the dummy print job. The IP address described in the job ticket 60 is information for identifying the processing apparatus 12 that has generated the dummy print job.

Since the print job implemented by the job ticket 60 is a dummy print job, document data and printing conditions are not specified in the job ticket 60.

After receiving the job ticket 60, the job receiving unit 32 of the WF management apparatus 10 determines whether the job ticket 60 has a dummy job determination tag. If a dummy job determination tag is described, the job receiving unit 32 verifies information described in the dummy job determination tag. In the example illustrated in FIG. 6, the character string "true" is described, and thus the job receiving unit 32 determines that the job ticket 60 is job ticket of a dummy print job. The job receiving unit 32 extracts the DFE job ID described in the DFE job ID tag in the job ticket 60 and the IP address described in the IP address tag in the job ticket 60 and registers, with the job management unit 34 of the WF management apparatus 10, the DFE job ID and the IP address that are extracted.

The job management unit 34 of the WF management apparatus 10 generates a WF job ID for causing the dummy print job specified in the job ticket 60 to be identified in the WF management apparatus 10. The job management unit 34 manages the WF job ID, the DFE job ID described in the job ticket 60, and the IP address described in the job ticket 60 in relation to each other.

The DFE job ID described in the job ticket 60 is identical to the DFE job ID of the non-dummy print job serving as the generation source of the dummy print job specified in the job ticket 60. Accordingly, relating the DFE job ID of the non-dummy print job serving as the generation source of the dummy print job to the WF job ID for causing the print job to be identified in the WF management apparatus 10 causes the non-dummy print job to be managed by the WF management apparatus 10.

In some cases, a non-dummy print job serving as the generation source of the dummy print job is a print job generated by the processing apparatus 12 or is a print job output from an apparatus (for example, a personal computer) other than the WF management apparatus 10 to the processing apparatus 12. Such a non-dummy print job is a print job not originally managed by the WF management apparatus 10, but outputting the job ticket 60 describing the DFE job ID of the non-dummy print job from the processing apparatus 12 to the WF management apparatus 10 causes the non-dummy print job to be managed by the WF management apparatus 10.

Hereinafter, a management table for managing print jobs will be described with reference to FIG. 7. FIG. 7 illustrates an example of the management table.

The print jobs registered in the management table illustrated in FIG. 7 are print jobs managed by the job management unit 34 of the WF management apparatus 10. The job management unit 34 manages the print jobs by using the management table illustrated in FIG. 7.

For each print job, a WF job ID for causing the print job to be identified in the WF management apparatus 10, the IP address of one of the processing apparatuses 12 that processes the print job, a DFE job ID for causing the print job to be identified in the processing apparatus 12, information indicating the status of the print job, and information indicating the number of sheets are related to each other in the management table.

The WF job ID is an identification generated by the job management unit 34 of the WF management apparatus 10.

In a case where the WF management apparatus 10 outputs a job ticket of a non-dummy print job to a processing apparatus 12, the IP address registered in the management table is the IP address of the processing apparatus 12 to which the job ticket is output. In a case where a processing apparatus 12 outputs a job ticket of a dummy print job to the WF management apparatus 10, the IP address registered in the management table is an IP address described in the job ticket of the dummy print job.

The DFE job ID is an identification generated by the job management unit 44 of a processing apparatus 12 and then output to the WF management apparatus 10. In a case where the WF management apparatus 10 outputs a job ticket of a non-dummy print job to a processing apparatus 12, the DFE job ID registered in the management table is the DFE job ID output from the processing apparatus 12 to the WF management apparatus 10 as a response to the output. In a case where a processing apparatus 12 outputs a job ticket of a dummy print job to the WF management apparatus 10, the DFE job ID registered in the management table is a DFE job ID described in the job ticket of the dummy print job.

The information indicating a job status is information indicating the status of a print job. The information indicating the number of sheets is information indicating the number of printed sheets. The information indicating the number of sheets may be included in the information indicating the status of the print job.

If the job receiving unit 32 of the WF management apparatus 10 receives a job ticket of a dummy print job, the job receiving unit 32 registers the DFE job ID and the IP address described in the job ticket, in the management table. The job management unit 34 generates a WF job ID and manages the WF job ID, the DFE job ID, and the IP address in relation to each other, by using the management table.

In the management table, information indicating whether the print job registered in the management table is a dummy print job may be related to the WF job ID, the IP address, and the DFE job ID. For example, the DFE job ID of a dummy print job is related to information indicating that the print job is a dummy print job. The DFE job ID of a non-dummy print job is not related to the information indicating that the print job is a dummy print job. The DFE job ID of the non-dummy print job may be related to information indicating that the print job is not a dummy print job.

On the basis of the IP addresses serving as the identifications of the respective processing apparatuses 12, the processing apparatus 12 that processes the job ticket of the print job indicated by the DFE job ID related to the IP address is identified. For example, the print job with the WF job ID "1" and the print job with the WF job ID "2" have the same DFE job ID related to a corresponding one of the WF job IDs but have different IP addresses. That is, the print job with the WF job ID "1" and the print job with the WF job ID "2" are processed by the respective different processing apparatuses 12. Although the identical DFE job IDs are generated as illustrated in FIG. 7 because each processing apparatus 12 separately generates a DFE job ID, the print jobs may be distinguished from each other on the basis of the different IP addresses related to the respective DFE job IDs.

Although the multiple processing apparatuses 12 are connected to the WF management apparatus 10 on occasions, the WF management apparatus 10 identifies each processing apparatus 12 on the basis of the corresponding IP address.

To make an inquiry about the status of a print job registered in the management table to a processing apparatus 12, the processing apparatus 12 to which the inquiry is to be made is identified on the basis of the IP address of the processing apparatus 12. The information acquisition unit 38 addresses the inquiry to the IP address of the processing apparatus 12 and updates the information indicating the status registered in the management table or the like, on the basis of the response.

For example, in a case where a non-dummy print job managed by the job management unit 44 of the processing apparatus 12 is deleted, the information acquisition unit 38 of the WF management apparatus 10 inquires the status of the processing apparatus 12 in such a manner as to specify the DFE job ID of the non-dummy print job and thereby recognizes the deletion of the non-dummy print job. The non-dummy print job is then deleted from the management table.

Hereinafter, processes by the information processing system according to the exemplary embodiment will be described with reference to FIG. 8. FIG. 8 is a flowchart illustrating the flow of the processes.

First, the address (for example, the IP address) of the WF management apparatus 10 is registered with the processing apparatus 12 (S01). The IP address of the WF management apparatus 10 is stored in the memory 28 of the processing apparatus 12.

The user then operates the UI 26 of the processing apparatus 12 to give an instruction to display a job management screen. In response, the job management unit 44 of the processing apparatus 12 causes the job management screen representing the list of non-dummy print jobs managed by the job management unit 44 to be displayed on the display of the UI 26.

The user then selects, from the list of the non-dummy print jobs, a non-dummy print job intended to be registered with the WF management apparatus 10 (that is, a registration target non-dummy print job) and gives an instruction to register the non-dummy print job with the WF management apparatus 10 (S02). The job ticket of the registration target non-dummy print job corresponds to an example of first print data.

In response to the user giving the instruction to register the non-dummy print job, the dummy job generation unit 46 generates a job ticket of the registration target non-dummy print job (S03). For example, the job ticket 60 illustrated in FIG. 7 is generated.

The dummy job generation unit 46 then outputs the job ticket of the dummy print job (for example, the job ticket 60) to the WF management apparatus 10 and requests the registration of the dummy print job with the WF management apparatus 10 (S04).

After the job ticket is output to the WF management apparatus 10, the job receiving unit 32 of the WF management apparatus 10 receives the job ticket (S05).

The job receiving unit 32 interprets a dummy job determination tag, if any, in the received job ticket (S06).

If the job ticket of the print job received by the job receiving unit 32 has a dummy job determination tag, and if the dummy job determination tag describes information indicating that the print job is a dummy print job (for example, the character string "true"), the job receiving unit 32 determines that the received job ticket of the print job is a job ticket of a dummy print job.

The job receiving unit 32 determines that the received job ticket of the print job is a job ticket of a non-dummy print job if any of the following conditions are satisfied: the job ticket of the print job received by the job receiving unit 32 does not have a dummy job determination tag; and the job ticket have a dummy job determination tag, but the dummy job determination tag does not describe information indicating that the print job is a dummy print job.

The job receiving unit 32 newly registers the received print job with the job management unit 34 (S07). The job management unit 34 newly generates a WF job ID and manages the print job received by the job receiving unit 32, by using the generated WF job ID.

If the job ticket received by the job receiving unit 32 is a job ticket of a dummy print job (for example, the job ticket 60), the job management unit 34 extracts the DFE job ID and the IP address from the job ticket and registers, in the management table (for example, the management table illustrated in FIG. 7), the newly generated WF job ID, the DFE job ID, and the IP address in relation to each other. The non-dummy print job not managed by the WF management apparatus 10 originally is thereby managed by the WF management apparatus 10.

If the job ticket received by the job receiving unit 32 is a job ticket of a non-dummy print job, the job management unit 34 registers, in the management table, the newly generated WF job ID, a DFE job ID received from the processing apparatus 12 as a response to the output of the job ticket to the processing apparatus 12, and the IP address of the processing apparatus 12 in relation to each other.

Step S08 and steps subsequent thereto may be performed or do not have to be performed. For example, the information acquisition unit 38 specifies the DFE job ID of a non-dummy print job intended for an inquiry and makes an inquiry about the status of the non-dummy print job to address the inquiry to the IP address related to the DFE job ID in the management table (S08). The information acquisition unit 38 may make the inquiry every predetermined time or in response to an instruction from the user.

The information notification unit 48 of the processing apparatus 12 acquires, from the job management unit 44, information indicating the status of the non-dummy print job regarding which the inquiry is made. The information notification unit 48 then outputs the information indicating the status to the WF management apparatus 10 (S09). The information indicating the status may include information such as information indicating the number of sheets.

The information acquisition unit 38 of the WF management apparatus 10 receives the information indicating the status, and the job management unit 34 of the WF management apparatus 10 updates the status, of the non-dummy print job regarding which the inquiry is made, in the management table (S10).

As described above, the processing apparatus 12 outputs, to the WF management apparatus 10, the job ticket of the dummy print job generated from the registration target non-dummy print job and thereby requests the WF management apparatus 10 to register the registration target non-dummy print job. In response to the request, the WF management apparatus 10 registers the non-dummy print job in the management table in such a manner as to relate the WF job ID to the DFE job ID and the IP address described in the job ticket. A registration target non-dummy print job that has not been registered in the management table is neither a print job that is generated by the WF management apparatus 10 nor a print job that is received from the external apparatus by the WF management apparatus 10 and that is then output to the processing apparatus 12. In this case, the non-dummy print job is newly registered with the WF management apparatus 10.

There is a case where the registration target non-dummy print job is a non-dummy print job output from the WF management apparatus 10 to the processing apparatus 12. For example, it is conceivable that in step S02, the user selects, as the registration target non-dummy print job, a non-dummy print job that is output from the WF management apparatus 10 to the processing apparatus 12 and thus that is managed by the processing apparatus 12. Also in this case, a job ticket of a dummy print job for the non-dummy print job is generated and then output from the processing apparatus 12 to the WF management apparatus 10. However, the non-dummy print job is a print job output from the WF management apparatus 10 to the processing apparatus 12 and thus has been managed by the job management unit 34 of the WF management apparatus 10. In this case, the DFE job ID and the IP address described in the job ticket of the dummy print job are not newly registered in the management table.

As described above, the WF management apparatus 10 newly manages: a non-dummy print job not generated by the WF management apparatus 10; and a non-dummy print job that is received by the WF management apparatus 10 from the external apparatus other than the processing apparatus 12 and that is not output to the processing apparatus 12.

As described above, if the dummy job determination tag in the job ticket of a print job received by the job receiving unit 32 of the WF management apparatus 10 describes the information indicating that the print job is a dummy print job (for example, the character string "true"), that is, if the job ticket is a job ticket of a dummy print job, the DFE job ID and the IP address described in the job ticket are managed by the job management unit 34 regardless of whether the job ticket specifies printing target document data.

Note that printing target document data is not specified in the job ticket 60 of the dummy print job described above, but printing target document data may be specified in the job ticket 60 of the dummy print job.

If the job ticket of the print job received by the job receiving unit 32 does not include dummy information, and if the job ticket does not specify printing target document data, the job management unit 34 of the WF management apparatus 10 may perform error handling. For example, the job management unit 34 deletes the job ticket of the print job in the error handling without registering the print job in the management table.

In more detailed description, if the dummy job determination tag in the job ticket does not have the information indicating that the print job is a dummy print job (for example, the character string "true"), that is, if the job ticket is a job ticket of a non-dummy print job, and if the job ticket does not specify printing target document data, the job management unit 34 of the WF management apparatus 10 performs the error handling. If the job ticket of the print job received by the job receiving unit 32 is a job ticket of a non-dummy print job, the printing target document data has naturally been specified. If the document data is not specified, the job ticket is an error job ticket. In this case, the job management unit 34 performs the error handling.

In the exemplary embodiment described above, the dummy print job for the non-dummy print job selected by the user is generated, and the job ticket of the dummy print job is output from the processing apparatus 12 to the WF management apparatus 10 (see steps S02 to S04 in FIG. 8).

In another example, the dummy job generation unit 46 may generate a job ticket of a dummy print job for a non-dummy print job not related to a WF job ID in the job management unit 44 of the processing apparatus 12, output the job ticket to the WF management apparatus 10, and thereby request the WF management apparatus 10 to register the non-dummy print job.

For example, the WF management apparatus 10 describes a WF job ID in the job ticket of the non-dummy print job, outputs the job ticket to the processing apparatus 12, and requests the processing apparatus 12 to process the non-dummy print job. The job management unit 44 of the processing apparatus 12 generates a DFE job ID for causing the non-dummy print job to be identified in the processing apparatus 12, and manages the DFE job ID in relation to the WF job ID. As described above, the job ticket of the non-dummy print job output from the WF management apparatus 10 to the processing apparatus 12 describes the WF job ID for causing the non-dummy print job to be identified in the WF management apparatus 10. Accordingly, a non-dummy print job that is managed by the job management unit 44 and for which the DFE job ID is not related to a WF job ID is not a print job that is output from the WF management apparatus 10 to the processing apparatus 12. The dummy job generation unit 46 identifies the DFE job ID managed by the job management unit 44 without being related to a WF job ID and generates the job ticket of the dummy print job for the non-dummy print job indicated by the identified DFE job ID. The dummy job generation unit 46 outputs the generated job ticket of the dummy print job to the WF management apparatus 10 and thereby requests the WF management apparatus 10 to register the non-dummy print job. The job ticket of the dummy print job for the non-dummy print job that has not been output from the WF management apparatus 10 to the processing apparatus 12 is thus generated, the job ticket is output to the WF management apparatus 10, and the non-dummy print job is registered with the job management unit 34 of the WF management apparatus 10.

As described above, on the basis of the presence or absence of the WF job ID, the processing apparatus 12 determines whether the non-dummy print job managed by the job management unit 44 of the processing apparatus 12 is a print job output from the WF management apparatus 10 to the processing apparatus 12.

A non-dummy print job that is managed by the job management unit 44 of the processing apparatus 12 and that is related to a WF job ID is identified as a non-dummy print job output from the WF management apparatus 10 to the processing apparatus 12. Since the non-dummy print job has been registered with the job management unit 34 of the WF management apparatus 10, the dummy job generation unit 46 does not generate a job ticket of a dummy print job for the non-dummy print job.

The non-dummy print job that is managed by the job management unit 44 of the processing apparatus 12 and that is not related to a WF job ID is identified as a print job other than the non-dummy print job output from the WF management apparatus 10 to the processing apparatus 12. Since the non-dummy print job has not been registered with the job management unit 34 of the WF management apparatus 10, the dummy job generation unit 46 generates a job ticket of a dummy print job for the non-dummy print job and outputs the job ticket to the WF management apparatus 10.

As described above, without the user not selecting a registration target non-dummy print job, the dummy job generation unit 46 may select the registration target non-dummy print job and generate a job ticket of a dummy print job for the non-dummy print job.

The dummy job generation unit 46 may generate a job ticket of a dummy print job for a non-dummy print job generated by the processing apparatus 12, output the job ticket to WF management apparatus 10, and request the registration of the non-dummy print job with the WF management apparatus 10. The generation of a non-dummy print job by the processing apparatus 12 conceptually includes duplication of a non-dummy print job. Even if the user does not select a registration target non-dummy print job, the dummy job generation unit 46 generates the job ticket of the dummy print job.

Generating a job ticket of a dummy print job and requesting the WF management apparatus 10 to register a print job are performed at timing when the processing apparatus 12 generates a non-dummy print job, when the processing apparatus 12 completes the processing of the non-dummy print job (for example, when raster data is generated), or when printing document data specified in the non-dummy print job is completed. The timing may be predetermined and may be changed by the user. For example, every time the processing apparatus 12 generates a non-dummy print job, the dummy job generation unit 46 generates a job ticket of a dummy print job and outputs the job ticket to the WF management apparatus 10. The operations are performed in the same manner at another timing.

The dummy job generation unit 46 may output the information indicating the status of the non-dummy print job to the WF management apparatus 10, together with the request to the WF management apparatus 10 for the registration of the non-dummy print job. For example, the dummy job generation unit 46 may output the information indicating the status of the non-dummy print job at the time of requesting the WF management apparatus 10 to register the non-dummy print job, together with the request the WF management apparatus 10. The job management unit 34 of the WF management apparatus 10 also manages the information indicating the status.

The dummy job generation unit 46 may generate a job ticket of a dummy print job for a non-dummy print job transmitted from an apparatus other than the WF management apparatus 10 to the processing apparatus 12, output the job ticket to the WF management apparatus 10, and request the WF management apparatus 10 to register the non-dummy print job with the WF management apparatus 10.

For example, if the job receiving unit 40 of the processing apparatus 12 receives a job ticket of a non-dummy print job transmitted from a personal computer other than the WF management apparatus 10 to the processing apparatus 12, the dummy job generation unit 46 generates a job ticket of a dummy print job for the non-dummy print job.

For example, every time the job receiving unit 40 receives a job ticket of a non-dummy print job from the apparatus other than the WF management apparatus 10, the dummy job generation unit 46 generates a job ticket of a dummy print job and outputs the job ticket to the WF management apparatus 10.

The above-described functions of the WF management apparatus 10 and the processing apparatus 12 are implemented, for example, in cooperation between hardware and software. For example, the processor of each apparatus reads and runs a program stored in the corresponding memory of the apparatus, and thereby the functions of the apparatus are implemented. The program is stored in the memory via a recording medium such as a compact disc or a digital versatile disk or via a communication path of a network or the like.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
a processing apparatus that includes a first processor and performs processing of print data; and
a management apparatus that includes a second processor, generates the print data, transmits the print data to the processing apparatus, and manages the print data, wherein the print data comprising a non-dummy print job and a dummy print job,
the first processor being configured to:
make a request to the management apparatus for registration of first print data with the management apparatus, the first print data serving as a target for processing by the processing apparatus, and
transmit management information to the management apparatus and make the request to the management apparatus for the registration of the first print data with the management apparatus, the management information including a first print data identification for causing the first print data to be identified in the processing apparatus and dummy information indicating a dummy,
the second processor being configured to:
receive the request for the registration from the processing apparatus, and in response to the first print data not being the print data generated by the management apparatus, newly register the first print data with the management apparatus and manage the first print data, wherein the first print data comprising a job ticket of a target non-dummy print job, and
receive the request for the registration from the processing apparatus, register, with the management apparatus, the first print data identification in the management information including the dummy information, and manage the first print data.

2. The information processing system according to claim 1,
wherein the second processor is configured to:
in response to the management information including the dummy information, regardless of whether the management information has printing target data, register the first print data identification with the management apparatus and manage the first print data; and
in response to the management information not including the dummy information and not including the printing target data, perform error handling in which the first print data is not managed.

3. The information processing system according to claim 2,
  wherein the management information further includes a processing apparatus identification for identifying the processing apparatus, and
  wherein the second processor is configured to:
    register, with the management apparatus, the first print data identification and the processing apparatus identification in relation to each other and manage the first print data.

4. The information processing system according to claim 2,
  wherein the second processor is configured to:
    transmit, to the processing apparatus, second print data generated by the management apparatus and a second print data identification for causing the second print data to be identified in the management apparatus, the second print data and the second print data identification being related to each other, and make a request to the processing apparatus for processing of the second print data, and
  wherein the first processor is configured to:
    make a request to the management apparatus for registration of print data that is not related to a second print data identification in the processing apparatus, the print data being to be registered as the first print data with the management apparatus.

5. The information processing system according to claim 3,
  wherein the second processor is configured to:
    transmit, to the processing apparatus, second print data generated by the management apparatus and a second print data identification for causing the second print data to be identified in the management apparatus, the second print data and the second print data identification being related to each other, and make a request to the processing apparatus for processing of the second print data, and
  wherein the first processor is configured to:
    make a request to the management apparatus for registration of print data that is not related to a second print data identification in the processing apparatus, the print data being to be registered as the first print data with the management apparatus.

6. The information processing system according to claim 1,
  wherein the first processor is configured to:
    make a request to the management apparatus for registration of print data selected by a user in the processing apparatus, the print data being to be registered as the first print data with the management apparatus.

7. The information processing system according to claim 2,
  wherein the first processor is configured to:
    make a request to the management apparatus for registration of print data selected by a user in the processing apparatus, the print data being to be registered as the first print data with the management apparatus.

8. The information processing system according to claim 3,
  wherein the first processor is configured to:
    make a request to the management apparatus for registration of print data selected by a user in the processing apparatus, the print data being to be registered as the first print data with the management apparatus.

9. The information processing system according to claim 1,
  wherein the first processor is configured to:
    make a request to the management apparatus for registration of print data generated by the processing apparatus, the print data being to be registered as the first print data with the management apparatus.

10. The information processing system according to claim 1,
  wherein the first processor is configured to:
    make a request to the management apparatus for registration of print data transmitted from an apparatus other than the management apparatus to the processing apparatus, the print data being to be registered as the first print data with the management apparatus.

11. The information processing system according to claim 1,
  wherein the first processor is further configured to:
    transmit, to the management apparatus, information indicating a status of the processing of the first print data, together with the request to management apparatus for the registration of the first print data.

12. An information processing apparatus comprising:
  a processor configured to:
    receive print data from a management apparatus and process the print data, wherein the print data comprising a non-dummy print job and a dummy print job, the management apparatus generating and managing the print data;
    transmit management information to the management apparatus and make a request to the management apparatus for registration of first print data with the management apparatus, the management information including a first print data identification for causing the first print data to be identified in the information processing apparatus and dummy information indicating a dummy, wherein the first print data comprising a job ticket of a target non-dummy print job; and
    receive the request for the registration from the processing apparatus, register, with the management apparatus, the first print data identification in the management information including the dummy information, and manage the first print data.

13. An information processing method comprising:
  performing processing of print data; and
  generating the print data, transmitting the print data to a processing apparatus, and managing the print data, wherein the print data comprising a non-dummy print job and a dummy print job;
  making a request for registration of first print data serving as a target for processing;
  transmitting management information to the management apparatus and making the request to the management apparatus for the registration of the first print data with the management apparatus, the management information including a first print data identification for causing the first print data to be identified in the processing apparatus and dummy information indicating a dummy,
  receiving the request for the registration, and in response to the first print data not being the print data generated in the generating, newly registering the first print data and managing the first print data, wherein the first print data comprising a job ticket of a target non-dummy print job; and receiving the request for the registration from the processing apparatus, registering, with the management apparatus, the first print data identification in the management information including the dummy information, and managing the first print data.

\* \* \* \* \*